United States Patent [19]

Yamashita et al.

[11] Patent Number: 5,708,705
[45] Date of Patent: Jan. 13, 1998

[54] WALLHUNG ARRANGEMENT FOR A CORDLESS TELEPHONE

[75] Inventors: Koji Yamashita; Mika Fujii, both of Tokyo, Japan

[73] Assignee: NEC Corporation, Tokyo, Japan

[21] Appl. No.: 430,530

[22] Filed: Apr. 27, 1995

[30] Foreign Application Priority Data

Apr. 28, 1994 [JP] Japan ............................ 6-113615

[51] Int. Cl.$^6$ ............................................. H04M 1/00
[52] U.S. Cl. ........................ 379/435; 379/454; 379/451
[58] Field of Search .............................. 379/435, 436, 379/428, 449, 451, 437, 454, 455, 446; 455/89, 90, 348, 351, 128; 439/335, 336, 676, 535

[56] References Cited

U.S. PATENT DOCUMENTS

| 4,299,344 | 11/1981 | Yamashita et al. | 455/351 |
| 4,569,567 | 2/1986 | Zucchini . | |
| 5,354,953 | 10/1994 | Nattel et al. | 439/535 |

FOREIGN PATENT DOCUMENTS

| 31 48 263 | 6/1983 | Germany . | |
| 1-311653 | 12/1989 | Japan | 379/449 |
| 3-40771 | 4/1991 | Japan . | |
| 4-20746 | 2/1992 | Japan . | |
| 4-128463 | 11/1992 | Japan . | |

OTHER PUBLICATIONS

ITT, The ITT Modular Wall Phone, Sep. 12, 1977.

*Primary Examiner*—Jack K. Chiang
*Attorney, Agent, or Firm*—Scully, Scott, Murphy & Presser

[57] ABSTRACT

A wallhung arrangement for a cordless telephone of the present invention is generally made up of a wiring implement buried in a wall, and a connecting unit for connecting a communication line. The wiring implement has on the front thereof an outlet for supplying AC power, and at least one modular connector for connecting a communication line. The connecting unit has a power supply plug and at least one modular jack at predetermined positions on the rear thereof. The power supply plug and modular jack are respectively connectable to the outlet and modular connector of the wiring implement. The connecting unit is affixed to the wiring implement by an affixing device. The connecting unit is pressed against the wiring implement to insert the power supply plug and modular jack into the outlet and modular connector, respectively. At the same time, the connecting unit is affixed to the wiring implement.

10 Claims, 6 Drawing Sheets

WALLHUNG ARRANGEMENT FOR A CORDLESS TELEPHONE

BACKGROUND OF THE INVENTION

The present invention relates to a cordless telephone and, more particularly, to a method and structure for mounting a connecting unit for a cordless telephone on a wall.

Various kinds of cordless telephones have recently been put on the market and extensively used even in homes. One of them has a connecting device connected to a telephone circuit, and a cordless transmitter/receiver. The connecting device is supplied with power via an AC adapter and a connecting cord and is connected to an indoor telephone line connector by a connection code and a cable. Specifically, the connecting device is connected to the outlet of a commercially available power source and a telephone line connector by a connection cord and a cable, respectively. Such a configuration, however, makes the cord arrangement troublesome and unsightly. Moreover, the location available for the connecting device is limited, depending on the locations of the outlet and connector. Hence, a special rack for mounting the connecting device is often required.

Various approaches have heretofore been proposed in order to obviated the above problems. For example, Japanese Utility Model Laid-Open Publication No. 4-128463 discloses a structure in which a connecting unit, having an AC power source connector and a modular jack, is connected to a facsimile apparatus. This kind of approach, however, cannot eliminate the troublesome and unsightly cord arrangement because a connection cord extends between the facsimile body and the connecting unit.

Another conventional structure is taught in Japanese Utility Model Laid-Open Publication No. 3-40771. The structure includes a box having a DC power source adapter and a modular jack and buried in a wall. Part of the terminals of the modular jack is connected to a self-sustaining power source. A problem with this scheme is that a commercially available cordless telephone is not usable due to such a special configuration. Another problem is that because the box must be buried by a qualified person at the time of building, the structure cannot be freely laid out and is awkward to use.

Further, Japanese Utility Model Laid-Open Publication No. 4-20746 proposes a telephone outlet with a power source. The telephone outlet has a modular jack whose opposite outermost terminals are used as DC power output terminals. This kind of scheme, like the buried box scheme stated above, prevents a commercially available cordless telephone to be connected to the outlet. In addition, the outlet protrudes from a wall and constitutes an obstruction.

Various standards are prescribed for wallhung AC power source outlets and telephone line connectors which should be built in the walls of houses in the event of construction. It is a common practice for the locations of the outlets and connectors to be determined by assumption beforehand, except for custom-built houses. For example, they are positioned in the vicinity of the corner walls of living rooms and adjacent to the bottoms of such walls, so that both ordinary electric appliances and telephones can be used. However, when a connecting device for a cordless telephone adjoins a floor, it is likely that some obstruction made of metal interferes with radio waves, i.e., conversation. For this reason, the connecting device must be positioned at a high level above the floor. As a result, cords for connecting the connecting device to the power source outlet and telephone line connector should be laid on a wall over a substantial distance. This is undesirable from the appearance viewpoint.

SUMMARY OF THE INVENTION

It is, therefore, an object of the present invention to provide a method and structure for allowing a connecting unit for a cordless telephone to be mounted on a wall by a simple operation, and a wiring implement and connecting unit therefor.

A wallhung arrangement for a cordless telephone of the present invention has a wiring implement buried in a wall, and a connecting unit for communication. The wiring implement has on the front thereof an outlet for supplying AC power, and at least one modular connector for connecting a communication line. The connecting unit has a power supply plug and at least one modular jack at predetermined positions on a rear thereof. The power supply plug and modular jack are respectively connectable to the outlet and modular connector. The connecting unit is affixed to the wiring implement by an affixing device.

To mount the connecting unit to the wall, it is pressed unit against the wiring implement to thereby insert the power supply plug and modular jack into the outlet and modular connector, respectively, while affixing the connecting unit to the wiring implement.

The connecting unit having the above configuration can be easily mounted to the wiring implement buried in a wall. The wallhung arrangement does not need cords which are undesirable from the appearance standpoint. Only if the wiring implement is buried in a high portion of a wall of a house at the time of construction, a cordless telephone, for example, can be immediately used by having the connecting unit mounted to the wiring implement. This makes it needless to prepare a rack or similar exclusive support for the connecting unit, thereby improving the living environment.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
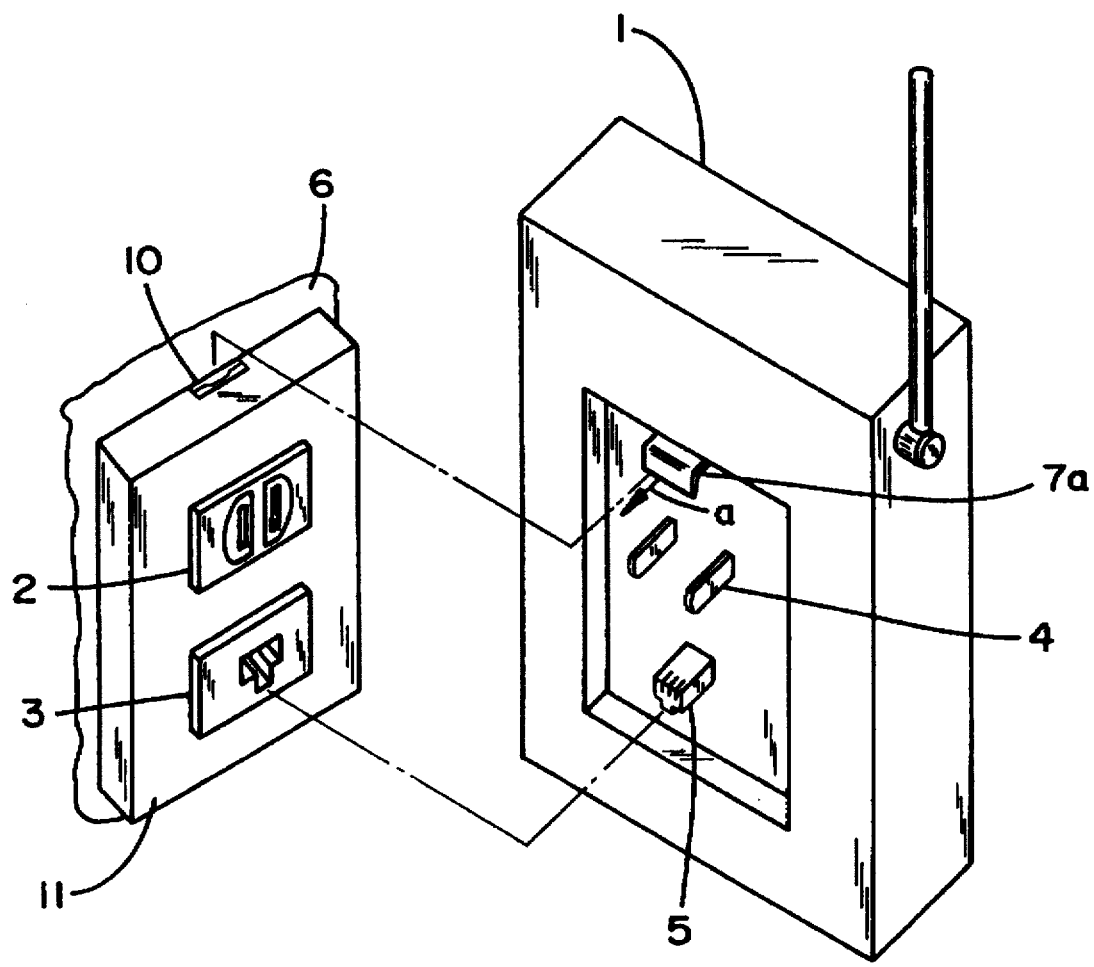
FIG. 1 is a perspective view of a wallhung arrangement for a cordless telephone and embodying the present invention.

Referring to FIG. 1 of the drawings, a wallhung arrangement for a cordless telephone and embodying the present invention is shown. As shown, the arrangement includes connecting unit 1 for interchanging signals with a cordless transceiver/receiver, not shown, by a radio wave. An AC power supply plug 4 and a modular jack 5 are affixed to the rear of the connecting unit 1. The modular jack 5 is connectable to a telephone circuit which will be described. A metal fitting 7 is positioned above the plug 4 and constantly biased by a spring which will be described. In this condition, the metal fitting 7 is rotatable in a direction perpendicular to the rear of the connecting unit 1, as indicated by an arrow a in the figure.

A wiring implement is mounted on a wall 6 and has an AC outlet 2 and a modular connector 3 which correspond in position to the plug 4 and the modular jack 5, respectively. The outlet 2 and plug 4 supply power to the connecting unit 1 when the latter is connected to the former. The modular connector 3 and modular jack 5 constitute a telephone circuit when connected to each other. A cover 11 covers the outlet 2 and connector 3 except for their surfaces to be connected to the connecting unit 1. A hook portion 10 is provided on the top of the cover 11 and formed with a recess. The connecting unit 1 is affixed to the wiring implement by having the fitting 7a thereof received in the recess of the hook portion 10.

To mount the connecting unit 1 to the wiring implement, the unit 1 is tilted such that the upper portion thereof approaches the wall 6. After the fitting 7a of the connecting unit 1 has been inserted into the hook portion 10, the unit 1 is bodily urged against the wall 6 while rotating about the fitting 7a. As a result, the plug 4 and jack 5 are inserted into the outlet 2 and connector 3, respectively.

If desired, the rear of the connecting unit 1 may be formed with a cavity great enough to receive the entire cover 11.

Figure 2:
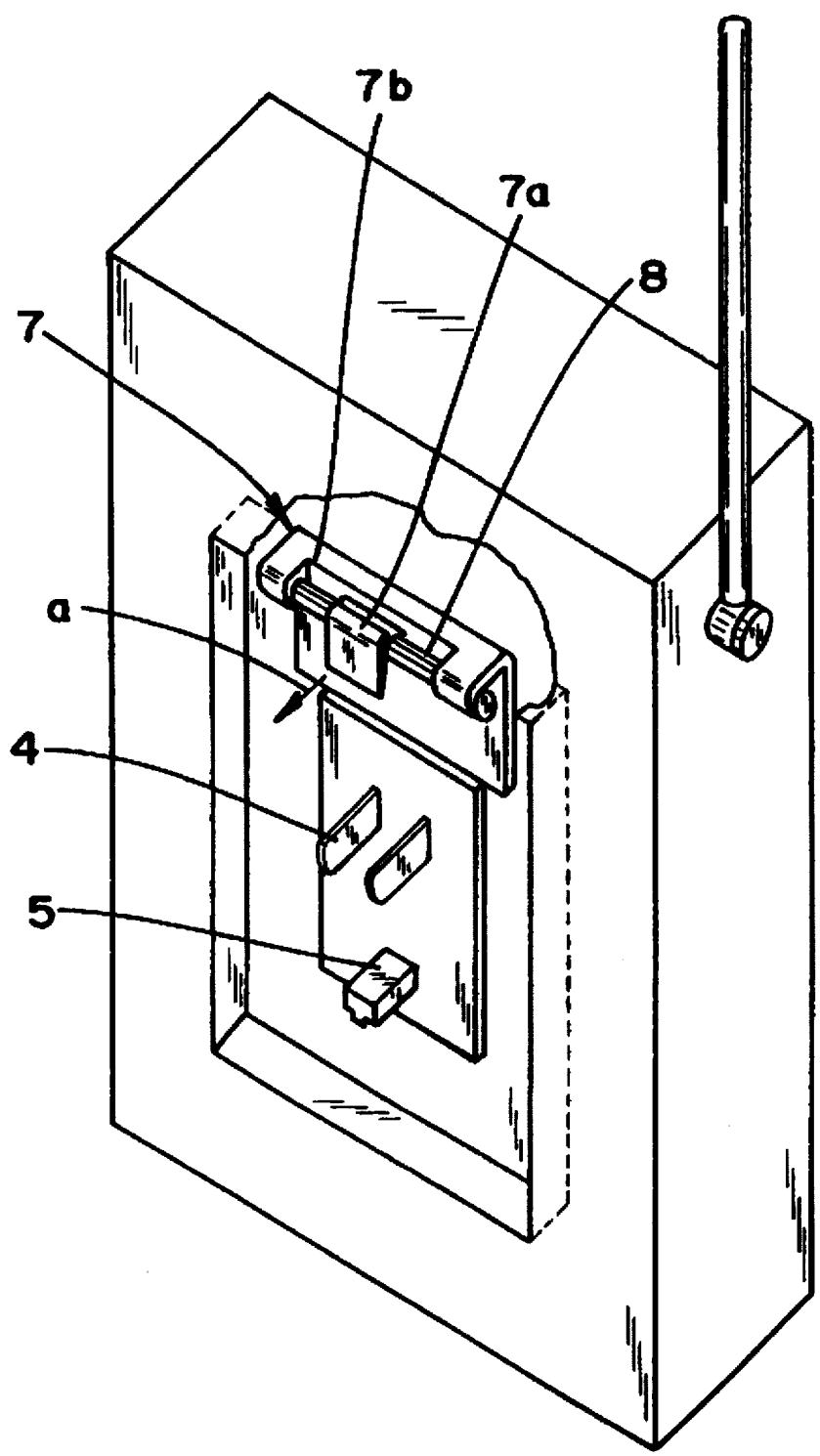
FIG. 2 is a partly taken away perspective view of a connecting unit 1 included in the embodiment.

FIG. 2 shows the connecting unit 1 in detail. As shown, a hanging portion 7 is provided on the upper portion of the rear of the unit 1. The hanging portion 7 has, in addition to the metal fixture 7a, a resilient pin 8 to which the fitting 7a is affixed, and a support portion 7b to which the pin 8 is affixed at opposite ends thereof. When the fitting 7a is engaged with the hook portion 10 of the wiring implement, it moves in the direction a due to the resiliency of the pin 8 and thereby facilitates the attachment of the unit 1.

Figure 3:
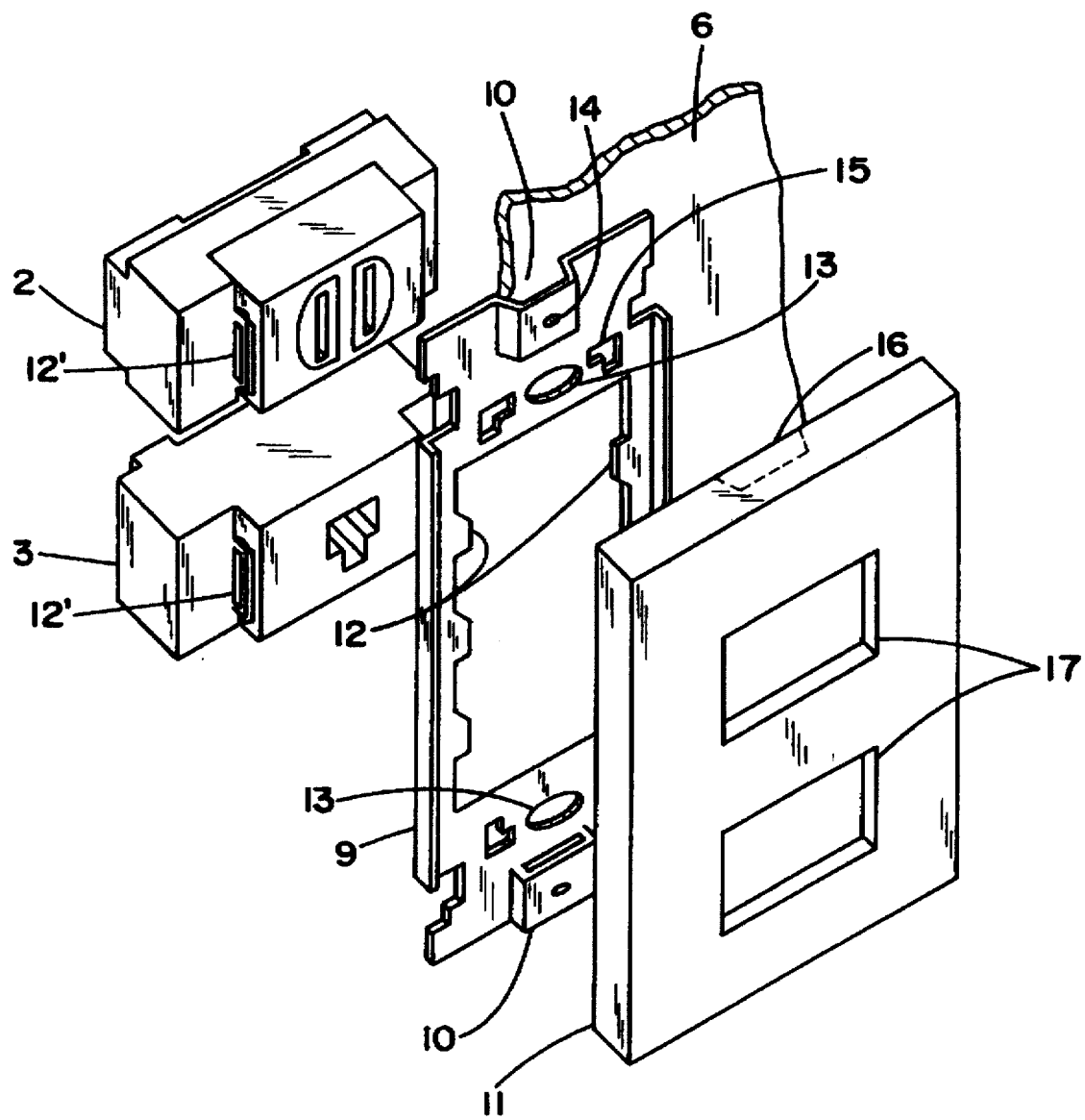
FIG. 3 is an exploded perspective view of a wiring implement also included in the embodiment.

Referring to FIG. 3, the wiring implement has a frame 9 for affixing the implement to the wall 6 and having a standardized shape and dimensions. The hook portion 10 for receiving the fitting 7a of the connecting unit 1 is formed at both of the upper and lower ends of the frame 9. Specifically, the upper and lower ends of the frame 9 are each partly cut and raised to form the hook portion 10. A plurality of pairs of lugs 12 extend toward each other from the inner edges of the frame 9 in order to fix the outlet, or AC power supply connector, 2 and modular connector 3 in their predetermined positions. The connectors 2 and 3 are each formed with a pair of recesses 12' for mating with the lugs 12.

A pair of oblong holes 13 are formed through the upper and lower portions of the frame 9. A burying box, not shown, is affixed to the frame 9 by screws, not shown, passed through the holes 13. Threaded holes 14 are formed in the hook portions 10 in order to affix the cover 11 to the frame 9. Further, holes 15 are formed through the frame 9 for receiving metallic pinching members, not shown.

The cover 11 has its thickness reduced in a portion 16 corresponding to the hook portion 10, so that the hook portion 10 can be easily exposed to the outside. Specifically, when a person purchased a cordless telephone set and mounts the connecting unit 1 on the wall, the person removes the thin portion 16 of the cover 11. As a result, the hook portion 10 is exposed to the outside. Then, the person inserts the metal fitting 7a of the connecting unit 1 into the hook portion 10 and moves the entire unit 1 in the manner stated earlier. Two openings 17 are formed through the cover 11 to allow the AC connector 2 and modular connector 3 to appear therethrough.

The wiring implement having the above configuration is buried in the wall of a house at the time of construction in the same way as wiring implements for ordinary appliances. Specifically, when a house is built, the wiring implement for a cordless telephone is affixed to a wall at a slightly high level above the floor. The wiring implement, located at a high level, is free from obstructions as to the propagation of radio waves and ensures smooth conversation. Further, because the connecting unit 1 has the metal fitting 7a received in the hook portion 10, it is fixed in place more surely than when it is simply placed on a desk. In this condition, the connecting unit 1 is protected even from vibration attributable to, for example, an earthquake. In addition, before the connecting unit 1 is mounted to the wiring implement, a painting, photograph or mirror may be hung on the wall by use of the hook portion 10 for an ornamental purpose, if desired.

Figure 4:
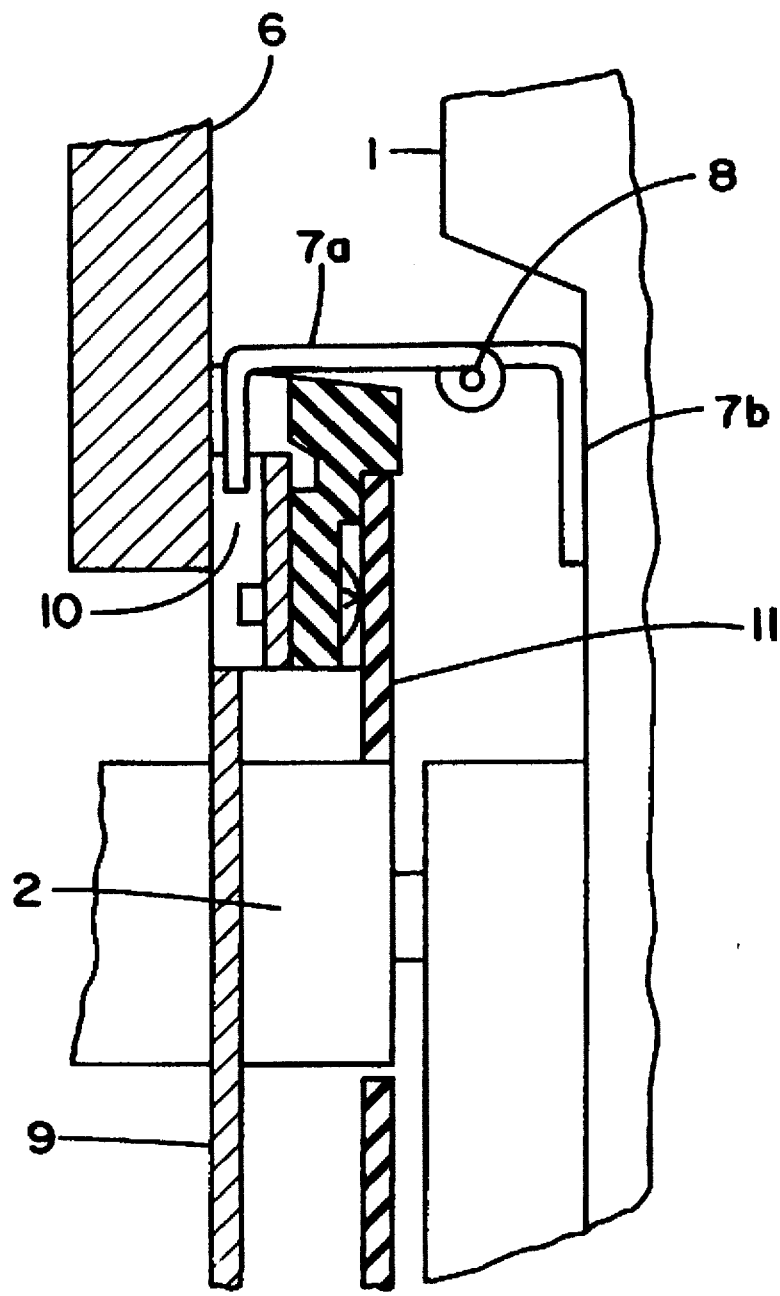
FIG. 4 is a fragmentary section showing the embodiment in detail.

FIG. 4 shows the illustrative embodiment in detail. As shown, the metal fitting 7a of the connecting unit 1 is received in the hook portion 10 of the wiring implement. The AC plug 4 and modular jack 5 are inserted in the AC outlet 2 and modular connector 3, respectively. If desired, another metal fitting 7a may be provided on the other end of the rear of the connecting unit 1 and received in the other or lower hook portion 10 of the frame 9.

Figure 5:
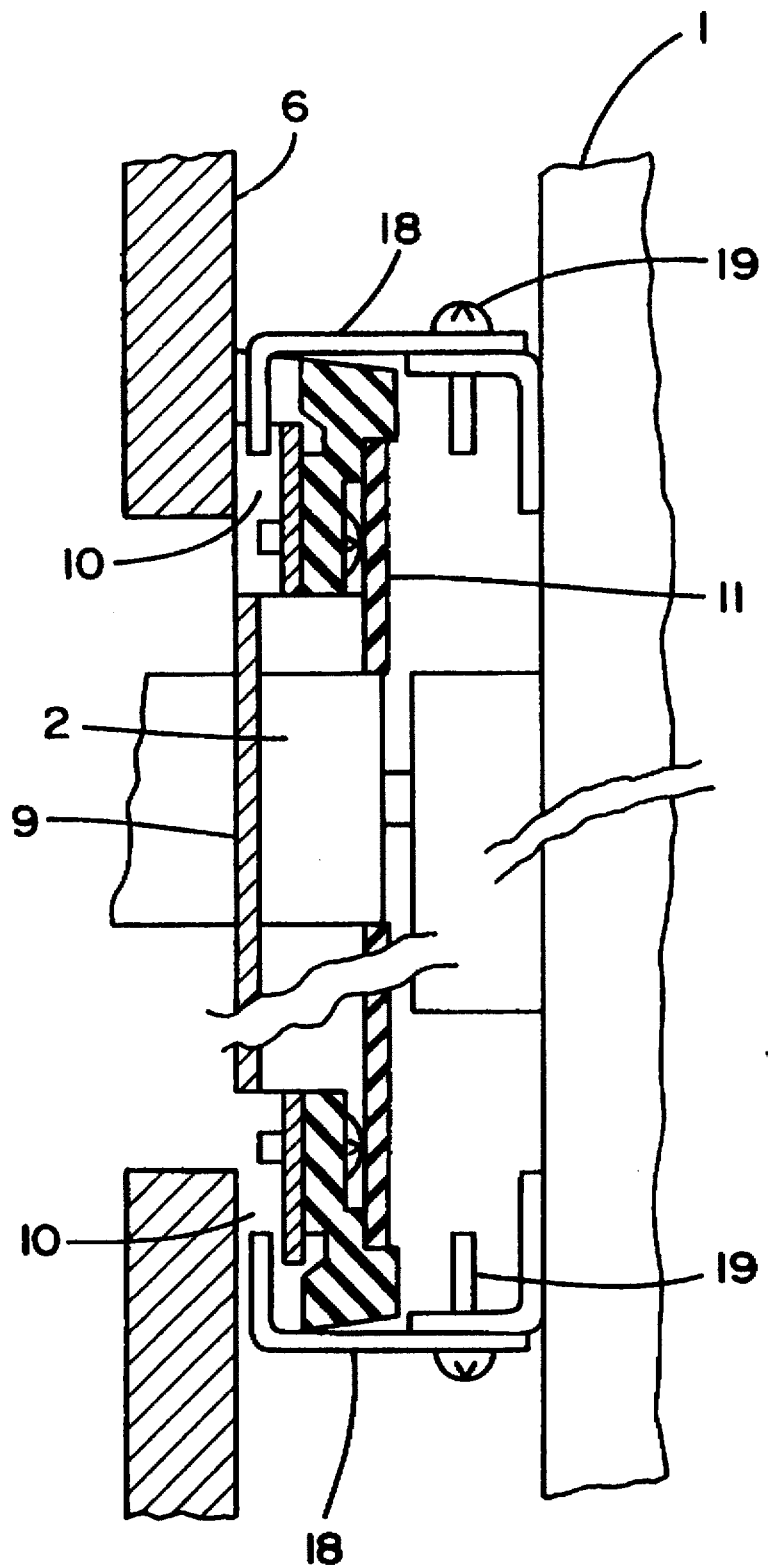
FIG. 5 is a fragmentary section of an alternative embodiment of the present invention.

An alternative embodiment of the present invention is shown in FIG. 5. As shown, a pair of metal fittings 18 are respectively positioned in the upper and lower portions of the rear of the connecting unit 1. The metal fittings 18 respectively mate with the hook portions 10 of the frame 9. In this embodiment, the AC plug 4 and modular jack 5 are respectively inserted into the AC outlet 2 and modular connector 3. Subsequently, the metal fittings 18 are inserted into the hook portions 10 and fastened to the connecting unit 1 by screws 19.

Figure 6:
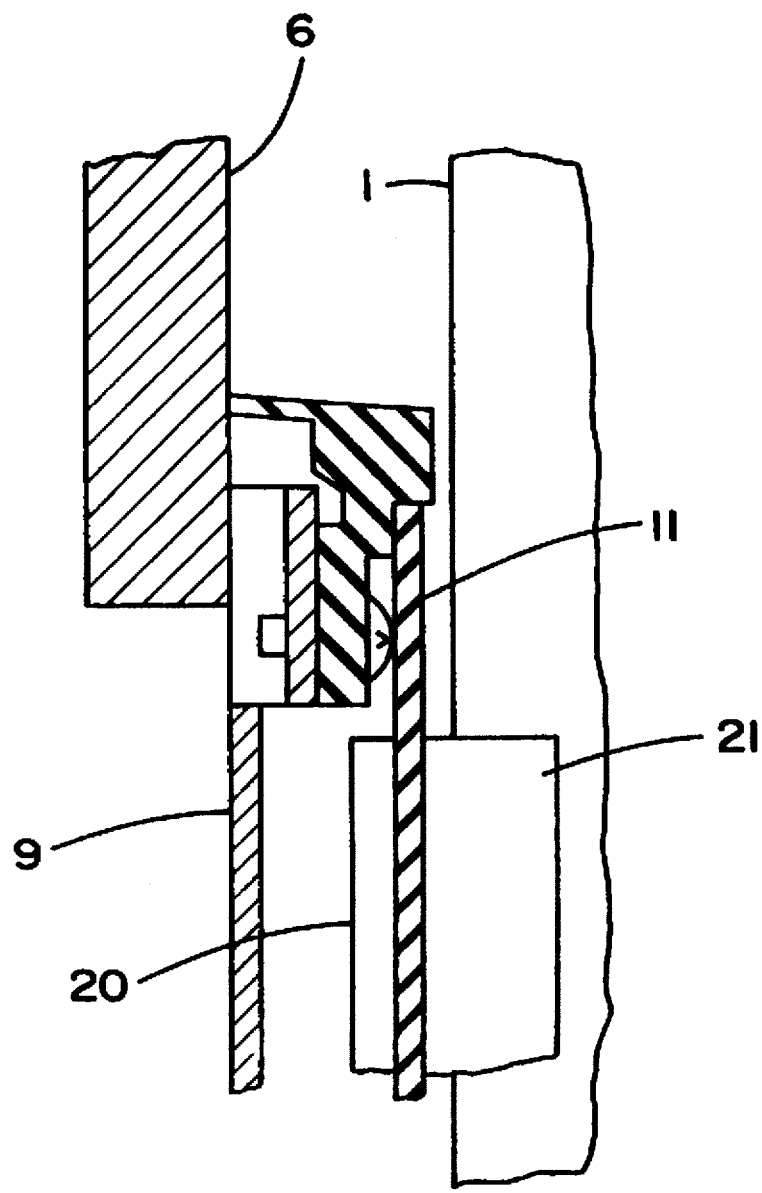
FIG. 6 is a fragmentary section of another alternative embodiment of the present invention.

FIG. 6 shows another alternative embodiment of the present invention. As shown, an iron plate 20 is affixed to the rear of the cover 11. A permanent magnet 21 is affixed to the rear of the connecting unit 1 at a position corresponding to the iron plate 20. Of course, the iron plate 20 is located at a position where the AC outlet 2 and modular connector 3 are absent. The plate 20 may be made of a magnetic material other than iron, if desired. When the connecting unit 1 is inserted into the wiring implement, it is automatically fixed in place with the plate 20 magnetically retained by the magnet 21.

While the embodiments have concentrated on a frame for having a single configuration, the present invention is, of course, practicable with a frame having a standardized double configuration.

Because the frame 9 is identical in configuration with standardized frames, it may be safely considered that plugs have a standardized pitch. Hence, only if the dimensions of the hook portion 10 and metal fitting 7a or 18 are standardized, the overall structure can be standardized. This will facilitate the production of equipment by manufacturers in the future and, in addition, allow manufacturers of wiring implements to handle the wiring equipment in the conventional manner.

What is claimed is:

1. A wallhung arrangement for a cordless telephone, comprising:

a wiring implement buried in a wall and comprising a cover structure having on a front thereof an outlet for supplying AC power, and at least one modular connector for connecting a communication line;

a connecting unit comprising a housing structure having a power supply plug and at least one modular jack at predetermined positions on a rear thereof, so as to face towards respectively said power supply outlet and said modular connector, said power supply plug and said modular jack being respectively connectable to said outlet and said modular connector; and affixing means for attaching said connecting unit to said wiring implement in an essentially superimposed relationship.

2. An arrangement as claimed in claim 1, wherein said affixing means comprises:
   a recess formed in an upper portion of said wiring implement; and
   a hooking member provided on the rear of said connecting unit and engageable with said recess of said wiring implement.

3. An arrangement as claimed in claim 1, wherein said affixing means comprises:
   a pair of recesses respectively formed in an upper portion and a lower portion of said wiring implement; and
   a pair of hooking members respectively provided in an upper portion and a lower portion of the rear of said connecting unit to be thereby fastened to said pair of recesses by screws.

4. An arrangement as claimed in claim 1, wherein said affixing means comprises:
   a plate mounted on said wiring implement and made of a magnetic material; and
   a magnet mounted on the rear of said connecting unit and for attracting said plate.

5. A method of mounting a connecting unit for a cordless telephone on a wall, comprising the steps of:
   preparing said connecting unit comprising a housing structure having a power supply plug and at least one modular jack at predetermined positions on a rear thereof;
   burying a wiring implement in a wall, wherein said implement includes a cover structure comprising on a front thereof an outlet for supplying AC power, and at least one modular connector for connecting a communication line; and
   pressing said connecting unit against said wiring implement with the rear of said connecting unit facing towards said wiring implement to thereby insert said power supply plug and said modular jack into said outlet and said modular connector, respectively, while attaching said connecting unit to said wiring implement.

6. A connecting unit for a cordless telephone and mounted to a wiring implement which is buried in a wall and has an outlet for supplying AC power and at least one modular connector for connecting a communication line, said outlet and said modular connector being spaced apart a predetermined distance from each other, said connecting unit including components comprising:
   a power supply plug provided on a rear of said connecting unit in a predetermined position facing said outlet for mating with said outlet;
   at least one modular jack provided on the rear of said connecting unit in a predetermined position facing said modular connector for mating with said modular connector; and
   affixing means for attaching said connecting unit to said wiring implement in the mating conditions of said components.

7. A connecting unit as claimed in claim 6, wherein said wiring implement is formed with an opening at an upper end thereof, said affixing means comprising a hooking member to be received in said opening.

8. A connecting unit as claimed in claim 7, wherein said hooking member is constantly biased by a spring member and movable in a direction perpendicular to the rear of said connecting unit.

9. A wiring implement buried in a wall and for mounting a connecting unit for a cordless telephone, said connecting unit comprising at predetermined positions of a rear thereof a power supply plug for supplying AC power, and at least one modular jack for connecting a communication line, said wiring implement comprising:
   an outlet provided on a front in a predetermined position for mating with said power supply plug;
   at least one modular connector provided on the front in a predetermined position for mating with said modular jack; and
   affixing means for affixing said connecting unit to said wiring implement.

10. A wiring implement as claimed in claim 9, further comprising a cover covering said wiring implement except for portions of said outlet and said modular connector to be used, said cover being reduced in thickness in a portion corresponding to said affixing means.

* * * * *